United States Patent [19]

Anderson

[11] Patent Number: 4,535,821

[45] Date of Patent: Aug. 20, 1985

[54] THREE WAY VALVE

[76] Inventor: John Anderson, 2109 Yosemite Dr., Milpitas, Calif. 95035

[21] Appl. No.: 634,282

[22] Filed: Jul. 25, 1984

Related U.S. Application Data

[63] Continuation of Ser. No. 379,734, May 19, 1982, abandoned.

[51] Int. Cl.³ .............................................. F16K 11/20
[52] U.S. Cl. ................................ 137/884; 137/625.37; 137/625.4; 137/625.48; 137/885; 403/294
[58] Field of Search ...................... 137/596.15, 625.37, 137/625.4, 625.48, 625.66, 625.67, 884, 885, 267; 251/DIG. 1; 285/137 R; 403/294, 298

[56]  References Cited

U.S. PATENT DOCUMENTS

| | | | |
|---|---|---|---|
| 2,764,181 | 9/1956 | Richolt | 137/625.4 |
| 2,782,801 | 2/1957 | Ludwig | 137/625.48 |
| 3,138,175 | 6/1964 | Chilcoat | 137/625.48 |
| 3,199,538 | 8/1965 | Anthon | 137/625.66 |
| 3,570,540 | 3/1971 | McInnes et al. | 137/625.48 |
| 3,678,959 | 7/1972 | Liposky | 137/625.4 |
| 3,680,596 | 8/1972 | Pickett | 137/625.69 |
| 3,718,159 | 2/1973 | Tennis | 137/596.12 |
| 3,847,059 | 11/1974 | Beck et al. | 91/461 |
| 3,917,318 | 11/1975 | Legris | 285/137 R X |
| 4,082,324 | 4/1978 | Obrecht | 285/137 R |
| 4,185,660 | 1/1980 | Faix | 137/625.66 |
| 4,210,050 | 7/1980 | Switzer | 137/625.68 |

FOREIGN PATENT DOCUMENTS

| | | | |
|---|---|---|---|
| 2034494 | 1/1972 | Fed. Rep. of Germany | 137/884 |
| 2515050 | 10/1975 | Fed. Rep. of Germany | 137/884 |
| 409494 | 8/1979 | Sweden | 137/625.37 |

Primary Examiner—Gerald A. Michalsky
Attorney, Agent, or Firm—Jack M. Wiseman

[57] ABSTRACT

A valve for directing corrosive fluids or the like from port to port without contamination includes beam members adapted to interconnect a plurality of valve bodies in stacked and interlocked relation, a control mechanism for moving the spool of a spool valve to a centered or off position, and a spool that makes possible an arrangement whereby a spool valve can be used as an aspirator that may be connected in a discharge conduit of a system from which caustic, abrasive or otherwise harmful fluid must be discharged.

5 Claims, 11 Drawing Figures

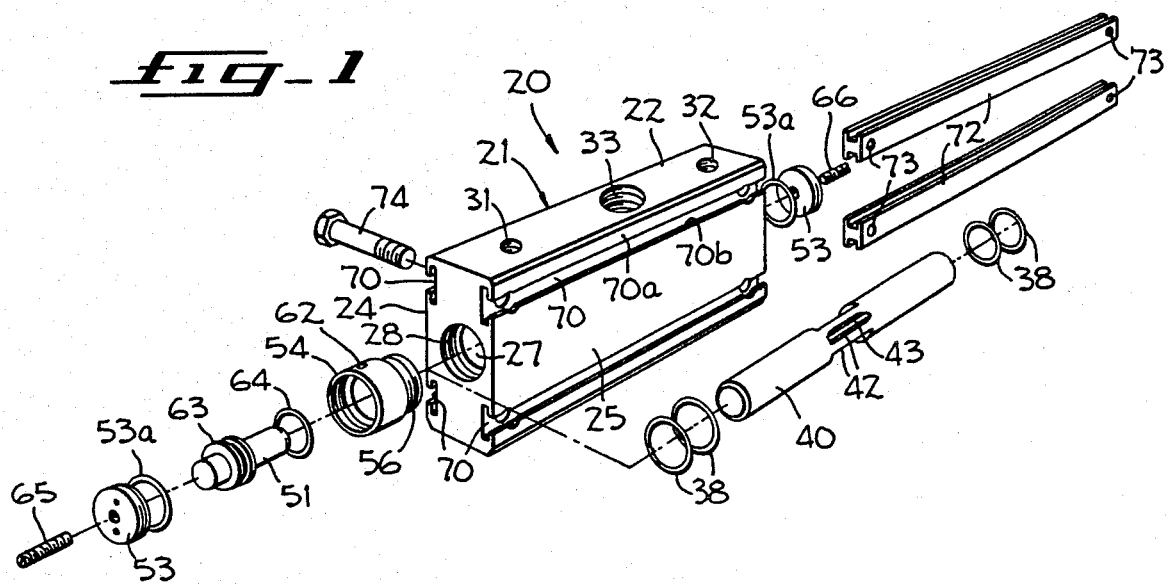
fig-1
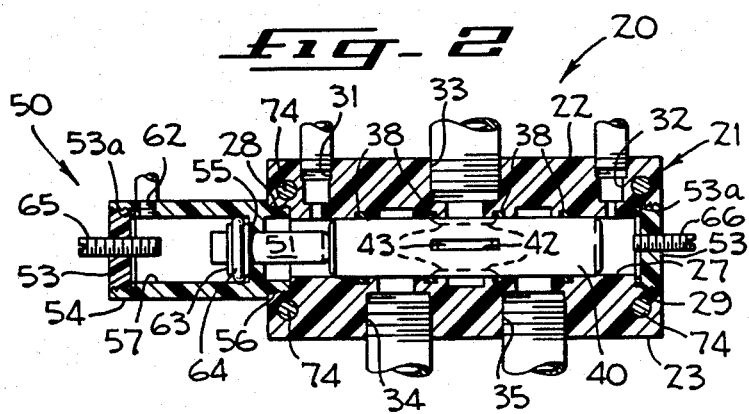
fig-2
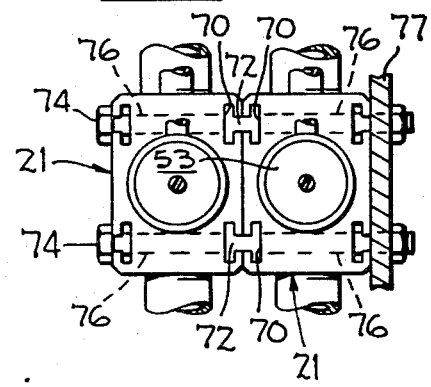
fig-3
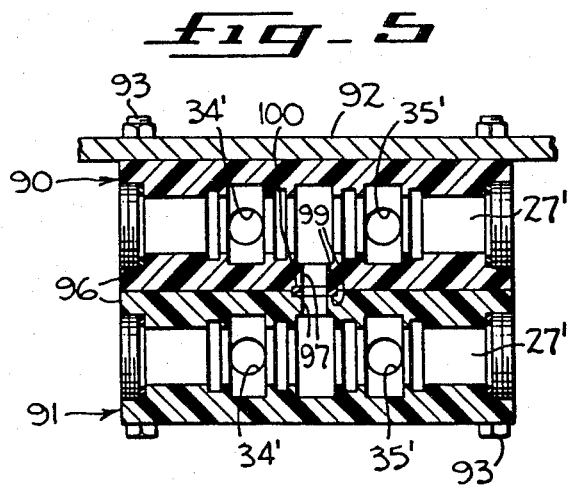
fig-4
fig-5

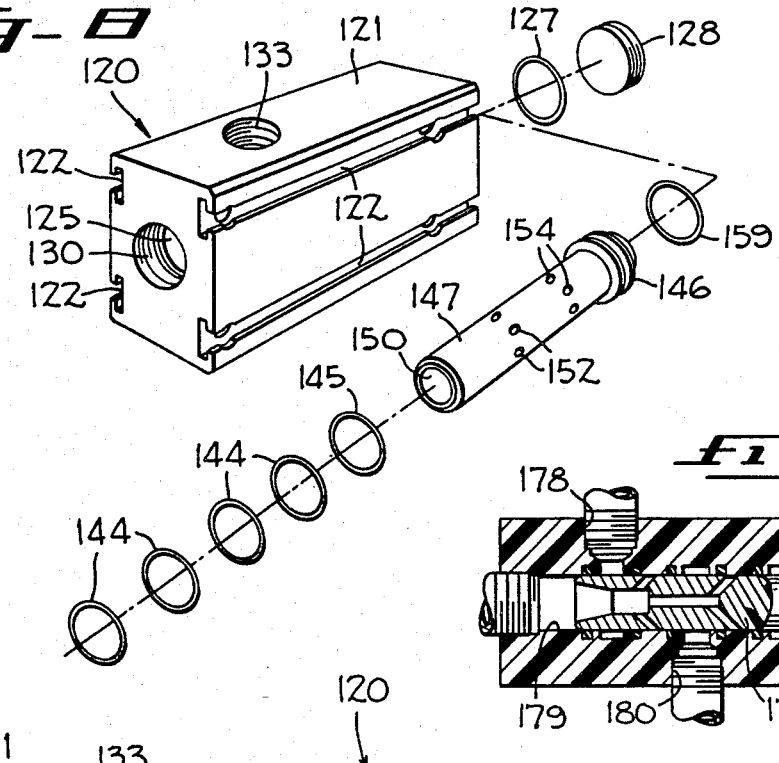
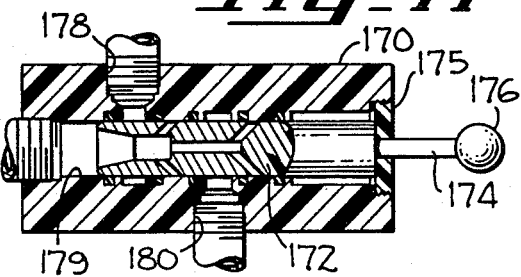
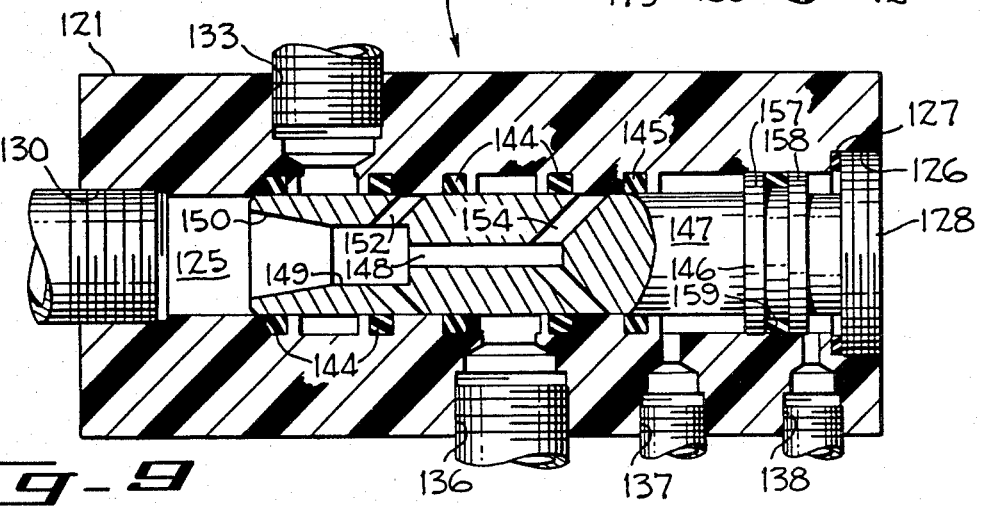
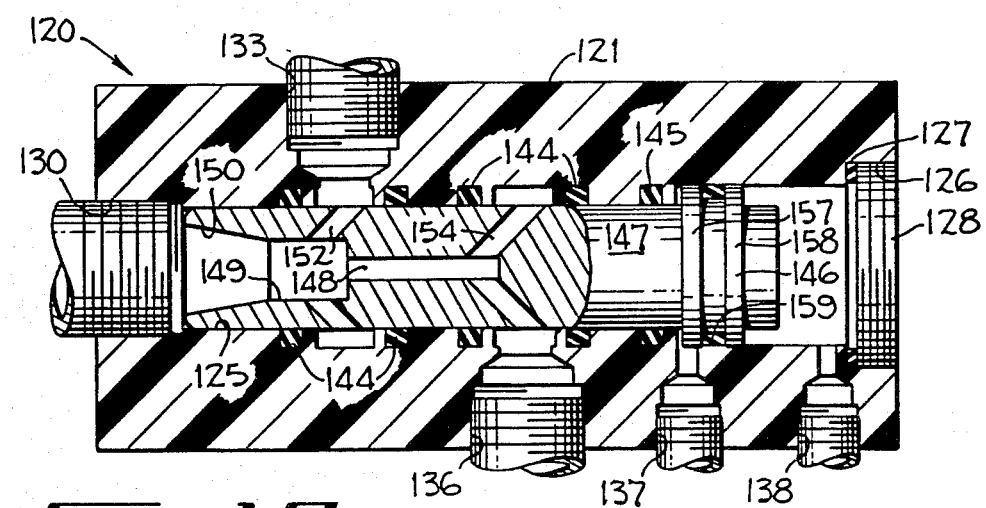

THREE WAY VALVE

RELATED APPLICATION

This application is a continuation application of my copending application, Ser. No. 06/379,734, filed on May 19, 1982, for Three Way Valve, now abandoned.

BACKGROUND OF THE INVENTION

This invention relates to a flow-control valve and more particularly to control valves using a longitudinally-reciprocating spool-type valving element.

The desirability of providing a valve that will move corrosive liquid or other fluid from port to port under controlled conditions which assure that the fluid cannot cause damage to the valve itself or to electrical components has long been recognized. Valves having bodies and operating elements made of various plastics that are resistant to particular caustic and corrosive liquids have been marketed in the past. Also, spool valves that can be operated by air have been provided for controlling the flow of various types of fluids. However, the advantages that are provided by making the elements of a valve of a material that is resistant to corrosive fluids and by actuating those elements by non-electric means to eliminate the possibility of contact between an electrical connection and the fluid, has not been generally recognized. Also, while the desirability of mounting valves in side-by-side relation to conserve space has been suggested, conventional flow-control valves are individual units that do not have means for supporting one valve from another in juxtaposed position or in longitudinal alignment. Accordingly, an object of the present invention is to provide a valve whose body and moving parts are made of a plastic that is resistant to corrosive material, and means is provided for supporting one valve from an adjacent valve.

SUMMARY OF THE INVENTION

Valve bodies are provided with retainer grooves which may be placed in aligned or juxtaposed position to jointly receive a locking beam which interconnects the bodies and supports one body from an adjacent body. In one embodiment, the valve is arranged for use as an aspirator to control the flow of a fluid, that is caustic, corrosive or the like, in a generally closed system.

DESCRIPTION OF THE DRAWINGS

FIG. 1 is a diagrammatic exploded perspective of a valve constructed according to the present invention with an optional valve centering mechanism shown at the left side of the view.

FIG. 2 is a longitudinal central section of the valve of FIG. 1 with the optional centering mechanism installed in the valve body.

FIG. 3 is a schematic view of two of the valves of FIG. 1 mounted in side-by-side relation on a common support panel.

FIG. 4 is a schematic perspective of another embodiment of the valve of the present invention wherein two valve assemblies are mounted in a side-by-side relation on a common panel.

FIG. 5 is a schematic section taken along line 5—5 of FIG. 4.

FIG. 8 is a diagrammatic exploded view in perspective of another embodiment of the valve of the present invention.

FIG. 9 is a central, longitudinal section of the valve of FIG. 8, with parts in elevation.

FIG. 10 is a view similar to FIG. 9 but showing the spool of the valve in a different operating position.

FIG. 11 is a fragmentary, central, longitudinal section of another embodiment of the valve.

DESCRIPTION OF A PREFERRED EMBODIMENT

Figure 6:
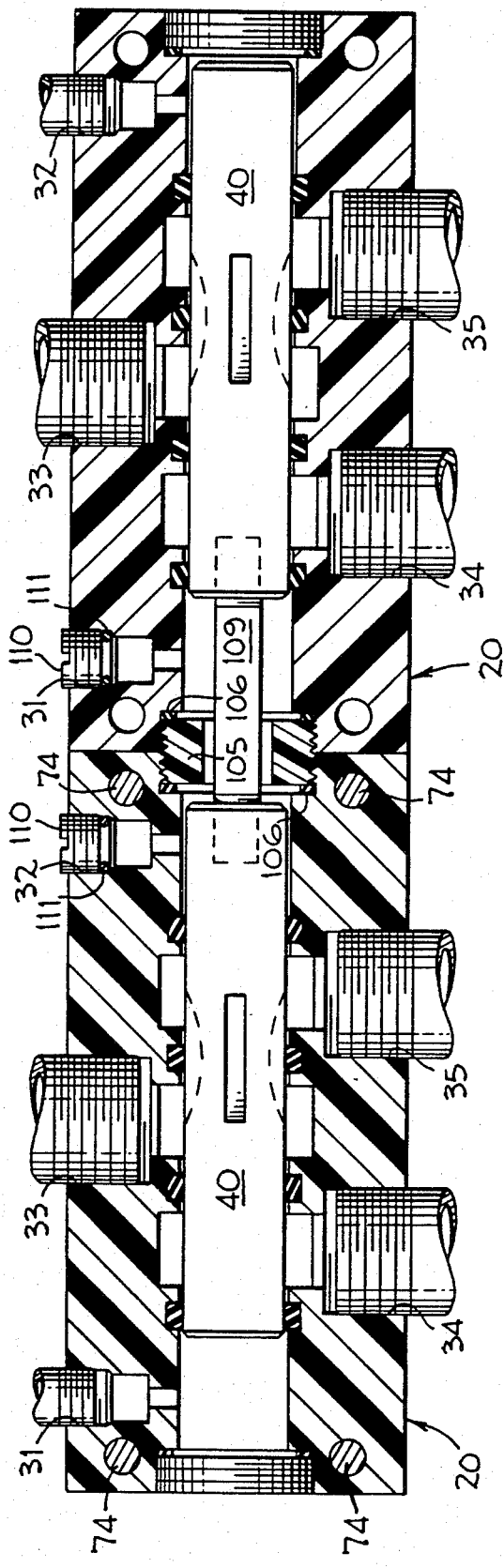
FIG. 6 is a longitudinal diagrammatic central section of another arrangement of the valve of the present invention.

In FIGS. 1 and 2 the reference numeral 20 indicates generally a valve constructed according to the teachings of the present invention, which comprises a blocklike body 21 having an upper wall 22, a lower wall 23, and side walls 24 and 25. A central passage 27 extends longitudinally through the body 21 and is provided at its ends with internally threaded openings 28 and 29. Two spaced, air inlet passages 31 and 32 extend downwardly through the upper wall 22 of the body 21 to communicate with the longitudinal passage 27. Also, an inlet passage 33 for the material whose flow is being controlled by the valve, extends down through the upper wall, and two spaced discharge openings 34 and 35 for the material extend through the lower wall 23 and communicate with the central passage. The outer ends of the passages 31–35 are threaded to receive conventional fittings for securing the air and material conduits in the passages.

A cylindrical spool 40 is disposed in sliding relation in the longitudinal passage 27. The spool is a solid member that has a cage-like control portion intermediate its length that is defined by a plurality of spaced, longitudinal walls 42 that extend generally radially inwardly and provide a plurality of slots 43 that extend radially inwardly to a central longitudinal opening in the spool, thereby providing a passage for material passing from the inlet passage 33 to one of the discharge passages 34 or 35. O-rings 38 (FIG. 2) are disposed in grooves in the wall defining the central passage 27 to prevent direct communication between the several passages 31–35 when the spool is in the centered or "off" position of FIG. 2.

In FIG. 2, a spool-centering unit 50 is shown attached to one end of the valve body. This unit has a housing 54 and a piston rod 51 extending through the opening 28 of the body. However, the valve can be used without this centering unit and, in that case a closure plug, that is identical to the plug 53 (FIG. 1) but has no center opening, is threaded into each of the end openings 28 and 29 of the body with an O-ring 53a between the end of the plug and the body. In operation, when no centering unit is used and the air inlet passage 32 is vented while pressurized air is directed into the valve through inlet passage 31, the spool is moved to the right (FIG. 2) to establish flow communication between the product inlet passage 33 and the discharge passage 35. When air inlet passage 31 is vented and pressurized air is directed into passage 32, the spool will be moved to the left (FIG. 2) to establish flow communication between the product inlet 33 and the discharge passage 34.

The spool-centering unit 50 includes the generally cylindrical housing 54 which has, at one end, an opening that is closed by one of the plugs 53 and has, at the other end, a reduced-diameter threaded portion 56 adapted to be engaged in the threaded opening 28 of the valve body when no closure plug is disposed therein. The housing 54 has a transverse wall 55 near one end and a central, longitudinal passage 57 that has a diameter larger than the diameter of passage 27 of the valve body. An air inlet passage 62 extends through one wall of the housing to the central passage 57 of the unit and is provided with an internally threaded socket at its outer end to receive an air conduit fitting. A piston 63, which is secured to or formed integrally with the rod 51, is provided with an O-ring 64 which sealingly engages the longitudinal inner cylindrical wall of the passage 57. A stop screw 65, having a screw driver slot at one end, is threaded through the tapped central opening in the plug 53 to extend into the passage 57.

To center the spool 40 in the "off" position shown in FIG. 2, air is directed into the air inlet passage 62 to move the piston to the right until it abuts transverse wall 55. At the same time, or shortly thereafter, air inlet passage 31 is vented and inlet passage 32 is pressurized to move the spool to the left until it abuts the end of piston rod 51. Since the air pressure at inlet 62 is the same as the pressure at inlet 32 and, since the effective area of the piston 63 is greater than the effective area of the right end of the spool 40, the piston rod 51 will not move to the left, when contacted by the spool. The spool is now in the "off" position.

A stop screw 66 is threaded into the plug 53 at the right hand end (FIG. 2) of the valve. The inner end of screw 66 limits the movement of the spool to the right, and the inner end of the stop screw 65 at the left end of the valve limits movement of the spool toward the left.

When the spool is in the centered or "off" position and it is desired to discharge material from the discharge passage 35, air inlet passage 32 is vented and air inlet passage 31 is pressurized. The spool is moved to the right against the stop screw 66. When the screw 66 is in the position of FIG. 2, a predetermined part of the lengths of the slots 43 will be in communication with the discharge passage 35. It will be evident that, if the stop screw 66 is threaded further into the central passage 27 of the valve, the spool will not be able to move as far to the right, and a lesser amount of the longitudinal length of the passages 43 in the spool will be in communication with the passage 35. Thus the adjustable stop screw 66 is effective to control or meter the quantity of material passing through the valve. The adjustable stop screw 65 at the left side of the valve is similarly adapted to vary the discharge from passage 34.

When it is desired to discharge material from passage 34, air inlet passage 32 is pressurized and both of the air passages 31 and 62 are vented. Accordingly the spool and the piston 64 move to the left (FIG. 2) until the end of the piston rod 51 engages the stop screw 65.

It is a feature of the present invention that the O-rings 38 make the spool 40 self-cleaning since the inner surfaces of the rings wipe the outer surface of the spool during reciprocation of the spool and prevent material build-up on the outer surface.

Referring to FIG. 1, it will be noted that two spaced grooves or ways 70, having overhanging edges 70a and 70b, are cut in each side wall of the body 21. When two valve bodies are mounted side-by-side as seen in FIG. 3, a groove 70 of one body is directly adjacent a groove in the other body, and a locking beam 72, which is generally H-shaped in cross section (FIG. 1), with a transverse through hole 73 near each end, is inserted in each pair of adjacent grooves. Then, when bolts 74 are inserted through the holes 73 in the beams and through transverse passages 76 (FIG. 3) in the bodies 21, and threaded into a fixed mounting panel 77 or the like, the two locking beams 72 will help support the outermost valve body 21 from the valve body that is closest to the panel.

In FIGS. 4 and 5 an embodiment of the valve construction of the present invention is shown which comprises two valves 90 and 91 mounted in side-by-side relation on a panel 92 by four bolts 93. Each of the valves 90 and 91 is almost identical to the valve 20 of FIG. 1 and parts of the valves 90 and 91 that are identical to the corresponding part of valve 20 will be given identical reference numerals followed by a single prime suffix. Two couplers 95, which are identical to the couplers 72 of FIG. 1, are disposed in adjacent grooves 70' in the valve bodies. The body 96 of each of the valves 90 and 91 is almost identical to the body 21 of FIGS. 1-3 except that each of the bodies 96 has a passage 97 (FIG. 5) in one side wall that extends from the outer surface of the wall to the control passage 27' of the body. A groove 99, which is formed in the side wall of each body around the passage 97, is generally semi-cylindrical in cross-section, but the depth of the groove is less than the radius of the cross-section of an O-ring 100 that is disposed between the confronting faces of the side walls. To assemble the side-by-side valve unit, the O-ring 100 is placed in the confronting grooves 99 and the valve bodies are then pressed toward each other to squeeze the O-ring and lock it in sealing engagement with the walls of the grooves. The beam-type couplers 95 are then slid into the adjacent grooves, as seen in FIG. 4, to lock the valve bodies together.

With the valve arrangement of FIG. 5 wherein the passages 97 form a cross-passage between the two central passages 27', the unit will provide twice as much discharge port area as when only one valve is used, even if one material inlet opening 33' is closed-off and all material enters through only one of such inlet openings.

Referring to FIG. 2, it will be evident that, if the spool is moved to the left, the product entering port 33 will pass through the spool and be discharged through port 35. If two valves are mounted side by side as in FIG. 5, the air supply conduits can be connected to the inlet ports 31' and 32' so that air is directed simultaneously to both ports 31' or to both ports 32', as is shown schematically by solid line conduits 101 and 102. Alternately, as shown in phantom lines, the conduits 101 and 102 can be arranged to simultaneously deliver air to the port 31' of one valve and the port 32' of the other valve. Considering first a situation in which the material inlet port 33' in valve 91 is plugged and the conduits 101 and 102 are arranged as shown in solid lines. When conduit 101 is pressurized and conduit 102 is vented, the spools of both valves will be moved to the right. Material entering port 33' of valve 90 can leave through the port 35' of that valve and can also travel through the aligned passages 97 and pass out through the port 35' of valve 91. Similarly, if conduit 102 is pressurized while conduit 101 is vented, both spools will be moved to the left and product entering valve 90 is discharged through port 34' of that valve but can also move through the aligned passages 97 and be discharged through post 34' of valve 91. The exit ports 34' and 35' of the two valves can be arranged to deliver the product to the same point or they can be arranged to deliver the product to different points.

If the phantom line arrangement of the conduits 101 and 102 is used, and conduit 101 is pressurized while conduit 102 is vented, the spool of valve 90 will be moved to the right while the spool of valve 91 will be moved to the left. Material entering port 33' of valve 90 is directed out through port 35' of valve 90 and is also directed through the cross passageway formed by passages 97 into the valve 91 for discharge from the port 34' from the left end of valve 91. If conduit 101 is pressurized while conduit 100 is vented, material is discharged from the left end of valve 90 and from the right end of valve 91.

Figure 7:
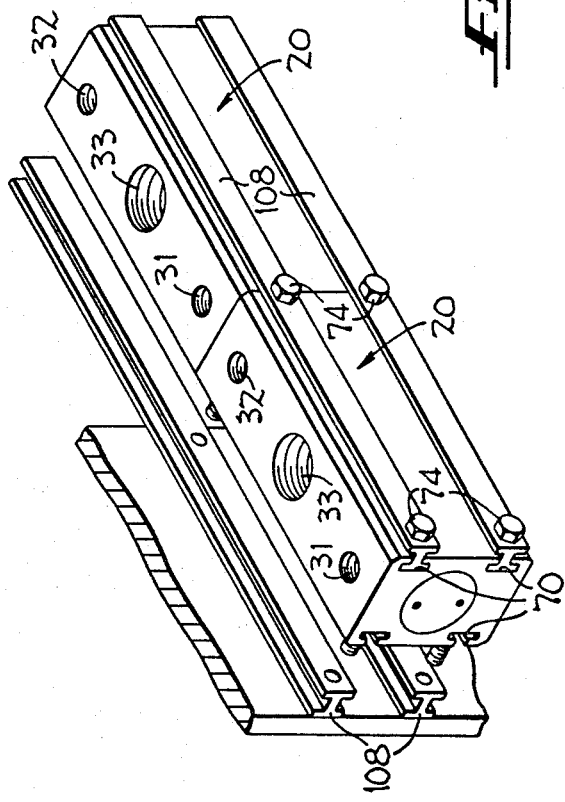
FIG. 7 is a fragmentary diagrammatic perspective of the valve arrangement of FIG. 6.

In FIGS. 6 and 7 an embodiment of the present invention is shown wherein two of the valves 20 of FIG. 1 are mounted in end-to-end sealed alignment by a coupling 105 and O-rings 106. With this arrangement, bolts 74 for mounting the valve to a panel are needed in only one of the valves since extra-long locking beam couplers 108 are arranged to extend through each aligned pair of grooves 70 to support one valve 20 from the other valve. It will be evident that the couplers 108 are identical to the couplers 72 of FIG. 1 except that each of the couplers 108 is longer than each of the couplers 72. Also, in this embodiment the spools 40 are connected together by a rod 109 that is threaded into adjacent ends of the spools. With this arrangement, the air inlet passage 32 of one valve and the air inlet passage 31 of the other are closed by plugs 110 and O-rings 111 so that one set of air inlets are used for this double capacity valve.

In FIGS. 8-10 is illustrated an embodiment 120 of the valve of the present invention that is adapted for use as an aspirator to draw material, such as a caustic etching solution, from a tank and propel it toward a reservoir. The valve 120 has a generally block-like body 121 which has a pair of grooves 122, that are identical to grooves 70 of FIG. 1, provided in each outer side wall 11. A central cylindrical passage 125 (FIG. 9) extends through the valve body, one end of the passage being defined by an internally threaded opening 126 adapted to receive an O-ring 127 and an end plug 128. At the other end of the central passage, an internally threaded opening 130 is arranged to receive a fitting of a discharge conduit which delivers the caustic etching solution to a reservoir.

A passage 133, by means of which the caustic solution enters the valve, extends through one wall of the body to the central passage 126. At its outer end passage 133 has a threaded socket adapted to receive a connector of a conduit leading from the source of caustic solution. Three other passages 136, 137 and 138 extend through the wall of the valve body to the central passage 125. Passage 136 has a threaded socket at its outer end that is adapted to receive a connector from a conduit leading to a source of aspirating liquid, such as a conduit connected to a municipal water supply. Passages 137 and 138 have threaded sockets, each of which is adapted to receive a connector of a conduit leading to a source of air under pressure. A plurality of O-rings 144 are disposed in cylindrical grooves in the surface forming the central passage 125 on opposite sides the lateral passages 133 and 136, and an O-ring 145 defines a chamber for a piston 146 formed on one end section of a spool 147.

The spool 147, which has a cylindrical outer surface slidably journalled in the passage 125, is provided at one end with a central opening which includes an elongate cylindrical section 148, an enlarged diameter section 149 and an outwardly flaring section 150. One set of slanted holes 152 extends from the outer surface of the spool to the enlarged diameter section 149, and a second set of slanted holes 154 extends from the outer surface to the elongated section 148.

The piston 146, which is integrally formed near the end of the spool opposite the flared opening, includes two spaced, enlarged-diameter members 157 and 158 disposed on opposite sides of an O-ring 159.

The spool 147 is arranged to move between the position of FIG. 9 and that of FIG. 10. When the spool is in the FIG. 9 position, the flow of caustic solution through passage 133 and the flow of city water through passage 136 are stopped. To initiate the flow of those liquids, air under pressure is directed into the central passage 125 through the lateral air passage 138 while passage 137 is vented. The air drives the piston and the spool to the left to the FIG. 10 position, causing the slanted passages 152 to communicate with the caustic passage 133, and causing the slanted passages 154 to communicate with the city water passage 136.

Water rushing through the central opening in the spool toward the exit opening 130 develops an aspirating or suction force that draws the caustic solution from passage 133 through the slanted passages 152 for discharge from the valve with the city water.

When air under pressure is directed into air passage 137 and passage 138 is vented, the spool will be moved back to the FIG. 9 position and the flow of caustic solution and city water will stop.

In FIG. 11 is disclosed an embodiment of the valve of FIG. 10 that is arranged for manual actuation of the spool. This valve includes a body 170 that is identical to the valve body 121 of FIG. 10 except that no air inlet passages 137 and 138 are provided in the FIG. 11 body 170. A spool 172 is disposed in the body 170, which spool is identical to the spool 147 of FIG. 10 except that no piston 146 is formed on spool 172 and that the spool is provided at one end with a tapped blind bore into which one end of a rod 174 is threaded. The rod 174 is slidably journalled in an end plug 175 and has a knob 176 formed on its end that is exterior of the body 170.

When the rod 174 is pulled out until the end of the spool 172 engages the plug 175, the valve is closed. As the rod is moved inwardly, a spool position that corresponds to the spool position of FIG. 10 is reached and the valve is then open.

As mentioned above, the valves of the present invention are adapted for handling corrosive and caustic materials and, accordingly, the valve body is made of a plastic that is resistant to such material, such as polyvinylchloride, polypropylene or PVDF depending upon the temperature of the liquid passing through the valve. In all cases, the spool is made of Teflon. O-rings, made from the material marketed by Parker-Hannifin company under the trademark Viton, have been successfully used in these valves. The embodiments of FIGS. 1-10 make use of air at a minimum pressure of 40 psig to move the spool.

From the foregoing description, it will be seen that the present invention provides a novel shuttle valve that not only effectively controls the direction of movement of liquid but, due to the fact that the valve can be connected in a closed conduit system, movement of the liquid is effected with no danger to the operator from splashing or discharging of caustic or corrosive material. The reciprocation of the spool manually or by air pressure also assures that no damage to electrical components is possible.

I claim:

1. A valve comprising a plurality of valve bodies, each of said bodies being formed with a central cylindrical longitudinally-extending cavity, a flow-control spool disposed in each of said cavities for sliding reciprocating movement, each of said flow-control spools being formed with passages, means defining a material inlet passage in the wall of each of said bodies extending from the exterior thereof to its associated cavity, means defining a plurality of discharge passages in each of said bodies communicating with the associated cavity and spaced angularly about the axis of the associated cylindrical cavity from the associated inlet passage and spaced axially along its associated cavity on either side of the associated inlet passage, each of said bodies being formed with spaced apart locking grooves to form spaced apart joint grooves when said bodies are in juxtaposition, and spaced apart elongated locking I-shaped beams disposed in said joint grooves respectively in tight fitting relation for locking said bodies to one another when said bodies are disposed in juxtaposition, each of said joint grooves having an I-shaped cross-sectional area, each of said locking I-shaped beams being adapted to be inserted endwise into its associated joint groove as a sliding rail, each of said locking grooves being defined by projecting means in the wall of its associated body engageable with an abutment on the elongated locking I-shaped beam disposed therein for preventing movement of the associated body away from the beam disposed therein, each of said locking grooves being defined in its associated body by a recess, wherein each of said projecting means is formed with a flange overhanging its associated recess, and the abutment means on each of said beams including an upstanding wall disposed along one side of its associated recess.

2. A valve as claimed in claim 1 and comprising a centering means for moving each of said spools respectively to an off position in which its passages are out of simultaneous communication with their associated inlet passage and either of their associated discharge passages.

3. A valve as claimed in claim 2 wherein each of said centering means includes an abutment member movable to a stop position in its associated cavity in the path of movement of its associated spool at the off position, and means for moving each of said spools longitudinally in its associated cavity into contact with its associated abutment member.

4. A valve as claimed in claim 3 wherein each of said means for moving its associated spool into contact with its associated abutment member includes a first air inlet passage communicating with its associated central cavity at one end of its associated body, and wherein each of said centering means includes air pressure means adjacent the other end of its associated body and operable on its associated member to move it to the off position.

5. A valve as claimed in claim 4 and further comprising a second air inlet passage communicating with each of said central cavities respectively at the other end of its associated body, whereby when its associated spool is in off position and its associated second air inlet passage is pressurized, the associated spool will move away from its associated abutment member to register the passages in its associated spool with the associated material inlet passage and one of the associated discharge passages and, when its associated second air inlet passage and its associated air pressure means is vented while its associated first air inlet passage is pressurized, the associated spool will move into engagement with its associated abutment member to displace it from off position and establish flow communication between the associated material inlet passage and the other associated material discharge passage.

* * * * *